May 31, 1938.  J. M. COUNCIL  2,119,454
TURPENTINE WORKER'S TOOL
Filed July 7, 1937
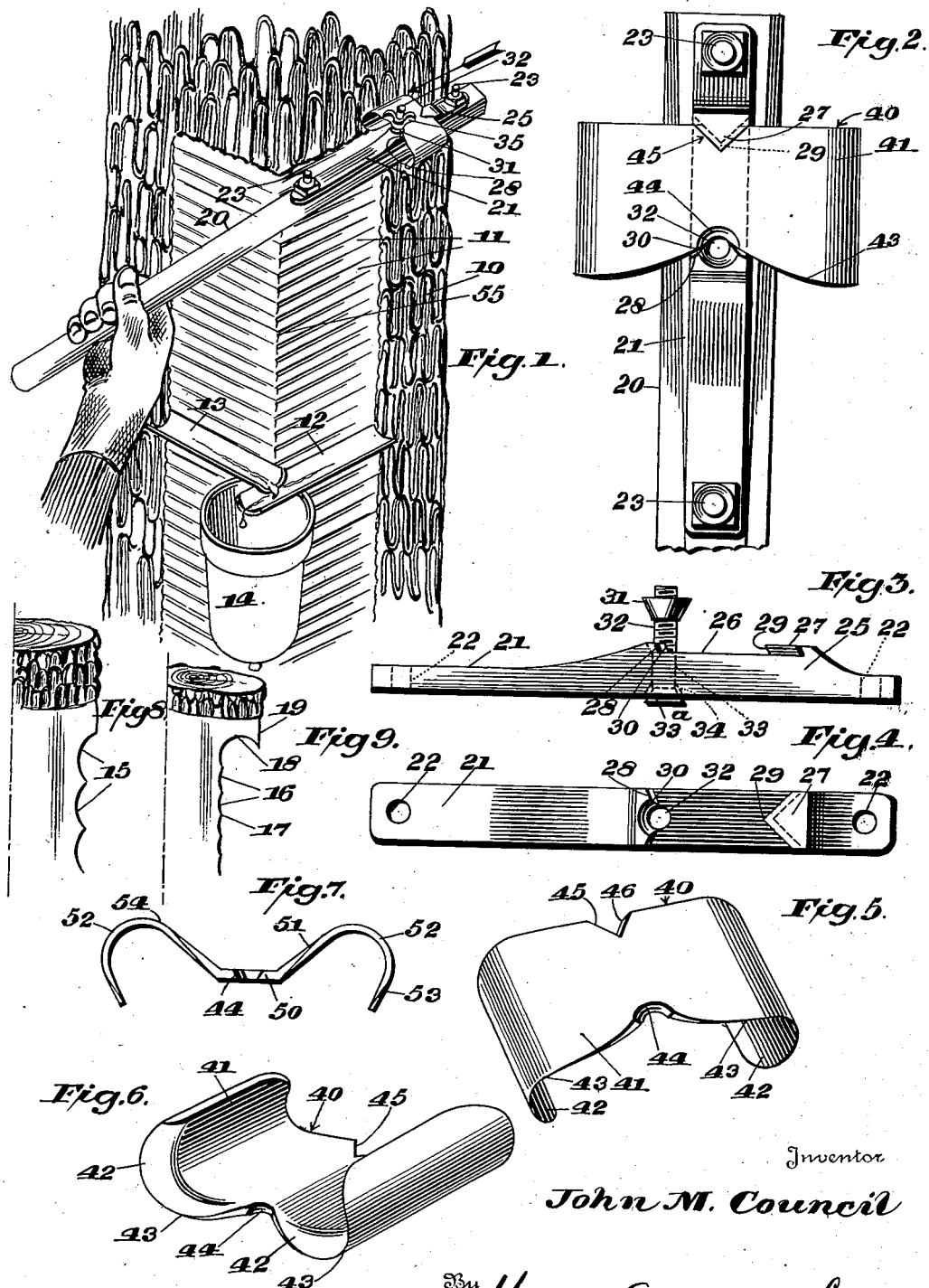
Inventor
John M. Council
By Munn, Anderson & Liddy
Attorneys Patented May 31, 1938

2,119,454

UNITED STATES PATENT OFFICE 2,119,454

TURPENTINE WORKER'S TOOL

John M. Council, Wananish, N. C.

Application July 7, 1937, Serial No. 152,459

3 Claims. (Cl. 30—121)

This invention relates to a turpentine worker's tool.

In recent years it has been found that in scarring or chipping pines that it is more practical to use a tool having a cutter curved on a small radius for obtaining the best results. The turpentine ducts of the pines are just below the cambium layer. Where the trees are chipped to a depth much below such layer a decrease in yield of gum is had.

While this decrease in radius or curvature has its advantage in increased production, it also has disadvantages in other ways. From the standpoint of the tool manufacturer the cost of production is increased and it is more difficult to keep a standard of high quality while from the user's standpoint the tools are hard to sharpen and to be maintained sharp.

Where the tools are dull they cause a stringy condition of the fibers which in turn tends to clog or close that portion of the trees and thus retard the flow of the gum. Some tools also have a tendency to leave a rough or corrugated surface and such type of surface retards the flow of the gum and therefore increases the time for the flow. This slow flow permits spirits of turpentine to be evaporated by the sun. Furthermore, it is necessary to provide what is known throughout the turpentine belt as a shade streak which will protect the cut from the sun and thus decrease the evaporation since it is a well known fact that after the fresh cut has been made the gum is in its most fluid state and hence the evaporation is at its highest degree. Thus the shade streak is undercut so that the outer ledge of wood shades the new cut and the gum will begin to solidify.

An object of the invention is the provision of a tool for scarring or chipping pines for the collection of gum turpentine in which a pair of curved cutters formed on a small radius is employed alternately for producing a depth of cut terminating adjacent the cambium layer of the pine whereby an increased yield of turpentine gum is produced.

Another object of the invention is the provision of a tool for use in scarring or chipping pines to cause the exudation of gum turpentine in such a manner that the proper depth of the cut is made to obtain the greatest efficiency, the cutters being readily replaceable from a staff so that sharpened cutters may be substituted for the cutters when they become dull or not sufficiently keen to produce a clear-cut scar or groove.

A further object of the invention is the provision of a tool for scarring and chipping pines for the collection of gum turpentine which will not only produce the desired cut but which will also provide the well known shade streak to prevent evaporation of the turpentine from the gum.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention.

In the drawing:

Figure 1 is a view in perspective showing my tool in operative position on the trunk of a pine tree, Figure 2 is a plan view of the tool with a part of the clamping means removed, Figure 3 is a side view in elevation of the shank of the tool, Figure 4 is a plan view of the shank shown in Figure 3, Figure 5 is a view in perspective of the double-edged cutter removed from the shank, Figure 6 is an inverted perspective of the cutter shown in Figure 5, Figure 7 is an end view of another form of the cutter, Figure 8 is a fragmentary view of the trunk of a pine tree showing the regular streak made by the blade, and Figure 9 is a similiar view to that shown in Figure 8 showing the shade streak.

Referring more particularly to Fig. 1 of the drawing, 10 generally designates a pine tree which has been provided with a plurality of cuts 11 from which the gum has exuded. This gum is then collected and carried to the stills. In scarring a tree the chips or cuts are made periodically until after thirty cuts or streaks have been made during a season. Gutters 12 and 13 are secured in place against the scarred portion of the tree and a container 14 collects the drippings from the lower ends of the gutters. These gutters are raised each season which lasts about thirty weeks. Thus it will be seen that where one streak is made per week that at the end of the season thirty streaks or scars have been cut.

Figure 8 shows the cuts 15 which have been made in the ordinary manner so that the surface is left quite rough between the cuts or streaks, giving the appearance of a washboard. In Fig. 9 is shown a fragmentary portion of a trunk which has been scarred or streaked at 16 in such a manner that the ridges 17 between the cuts have been reduced to a minimum. Furthermore, the streak has been undercut, as shown at 18 so that the projecting portion 19 of the trunk will form a shade or protective medium for the freely exuding gum. This shade will protect the newly formed gum against the sunlight and prevent evaporation.

Referring more particularly to Figs. 2 to 6, inclusive, it will be seen that a staff 20 is provided upon which is secured a shank, generally designated by the numeral 21. This shank is elongated and is provided with perforations 22 at its opposite ends through which are inserted bolts 23. These bolts are also inserted through perforations in the staff 20 for rigidly attaching the shank to said staff.

The shank is provided with a raised portion 25 which has a recess 26 formed between a V-shaped finger 27 and a shoulder 28. The finger is undercut, as shown at 29 along both of its edges while the shoulder 28 is cut away at 30 to receive a portion of a wedge washer 31.

A threaded bolt 32 projects through a passage 33 in the shank 21 and is located centrally of the cut-away portion 39. The bolt is provided with a beveled head 33a which is located within a countersunk portion 34 in the passage 33. A wing nut 35 is screwed onto the outer end of the threaded bolt 32.

A blade, generally designated by the numeral 40, has a flat body portion 41 and curved cutters 42. The confronting or cutting edges 43 of the cutters 42 extend inwardly towards the center and terminate in a beveled notch 44. Directly opposite the beveled notch 44 is another beveled V-shaped notch 45 and the edges of the last-mentioned notch are complementarily formed with the undercut portions 29 of the finger 27 so that the beveled edges 46 of the notch 45 are received beneath the finger 27 for maintaining the outer edge of the blade on the shank 21. The beveled notch 44 and the beveled notch or cut-away portion 30 of the shoulder 28 are formed along an arc of a circle which has substantially the same diameter so that the frusto-conically-shaped wedging member 31 will fit neatly within the notches 30 and 44. The member 31 when clamped in place by the wing nut 35 will rigidly secure the blade in position on the shank.

The cutters 42 are curved along an arc which has a relatively small diameter and these curved cutters extend outwardly from the body member 41, then downwardly and inwardly towards the side walls of the staff 20. The cutting edges 43 are so formed that they will provide a neat and rapid cut of the pine trees. The ready removability of the blades permits rapid substitution of a fresh blade for a dull one so that the worker will not lose any time by the exchange and whereby he will be supplied with a blade having sharpened cutters which will make a neat, clear cut. When these blades become too dull they will produce a rough effect and will tend to close the portion of the wood which will delay the period for the exudation of the gum turpentine from the trees.

Referring more particularly to Fig. 7 it will be seen that another form of the blade is provided which has a flat body portion 50, outwardly and upwardly inclined portions 51, a downwardly curved portion 52 and a slightly inturned portion 53. The edges 54 which face the operator are sharpened so that this tool will not only provide the cut shown in Fig. 8 but will very readily produce the shade streak 18 which gives a sharp undercut having the overhanging lip 19 which will protect the newly formed cut against the direct rays of the sun.

This tool is moved in the direction shown in Fig. 1 towards the edge 55 from opposite sides of the tree. The body member 50 is provided with the oppositely disposed notches 44 and 45 and these notches are identical with that shown in Figure 5 for securing the blade to the shank.

I claim:

1. A turpentine worker's tool comprising a staff, a shank secured to said staff and provided with a recess, an undercut V-shaped finger at one end of the recess, a shoulder at the opposite end of said recess and having a beveled notch, a threaded bolt projecting from the recess at the notch, a blade extending transversely of the shank and having a body portion received by the recess, said body portion having a beveled notch received by the undercut finger and a second beveled notch facing the notch in the shoulder, and clamping means on the bolt and received by the first and last-mentioned notches for removably attaching the blade to the shank.

2. A turpentine worker's tool comprising a staff, a shank secured to said staff, a blade including a body and cutters at the opposite ends thereof, means for removably securing the blade transversely to the shank including cooperating means on one edge of the body and the shank and a clamping means carried by the shank and adapted to engage the opposite edge of the body for forcing the cooperating means into binding relation with each other.

3. A turpentine worker's tool comprising a staff, an elongated shank secured longitudinally to one end of the staff, a blade including a body and cutters at the opposite ends of the body, the opposite edges of the body having notches, means for removably securing said body to the shank including a finger on the shank engaging one of the notches in the body, said shank having a notch opposite the other notch in the body, and clamping means received by the last-mentioned notches in the shank and body for securing the body to the shank.

JOHN M. COUNCIL.